US008134793B1

(12) United States Patent
Vasquez et al.

(10) Patent No.: US 8,134,793 B1
(45) Date of Patent: Mar. 13, 2012

(54) METHODS AND SYSTEMS FOR FAST RELEASE OF DATA FROM A HOST BY A DISK DRIVE

(75) Inventors: Steven R. Vasquez, Rancho Santa Margarita, CA (US); George J. Bennett, Murrieta, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 0 days.

(21) Appl. No.: 12/818,085

(22) Filed: Jun. 17, 2010

(51) Int. Cl.
*G11B 5/09* (2006.01)
(52) U.S. Cl. ........................................... 360/53
(58) Field of Classification Search .................. None
See application file for complete search history.

(56) References Cited

U.S. PATENT DOCUMENTS

| | | | | |
|---|---|---|---|---|
| 6,021,012 A * | 2/2000 | Bang | | 360/51 |
| 6,081,397 A * | 6/2000 | Belser | | 360/51 |
| 6,157,984 A * | 12/2000 | Fisher et al. | | 711/112 |
| 6,449,111 B1 * | 9/2002 | Kool et al. | | 360/53 |
| 7,212,374 B1 * | 5/2007 | Wang et al | | 360/78.14 |
| 7,516,268 B2 | 4/2009 | Hung | | |
| 7,653,791 B2 | 1/2010 | McKenney | | |
| 7,885,027 B2 * | 2/2011 | Kitamura et al. | | 360/53 |
| 2006/0085614 A1 | 4/2006 | Sakai et al. | | |
| 2008/0288497 A1 | 11/2008 | Watanabe et al. | | |

* cited by examiner

*Primary Examiner* — K. Wong (57) ABSTRACT

A disk drive comprising a disk, a head actuated over the disk, a read/write channel, a control processor, and a servo system is disclosed. The servo system is configured to read servo information from a servo wedge on the disk via the read/write channel, to generate first and second status information based on the read servo information, to output the first and second status information to the control processor, and to output first and second interrupt signals to the control processor, the first and second interrupt signals being spaced apart by a time delay. In response to the first interrupt signal, the control processor is configured to determine whether to release data from a host based on the first status information, and in response to the second interrupt signal, the control processor is configured to determine whether to release data from the host based on the second status information.

23 Claims, 7 Drawing Sheets

METHODS AND SYSTEMS FOR FAST RELEASE OF DATA FROM A HOST BY A DISK DRIVE

BACKGROUND

A disk drive comprises a rotating disk and a head actuated over the disk to magnetically write data to and read data from the disk. The head may be connected to a distal end of an actuator arm that is rotated about a pivot to position the head radially over the disk. The disk may comprise a plurality of radially spaced, concentric tracks for recording data and servo information on the disk. The servo information may be read by the head to determine the position of the head over the disk. The disk drive may also include a buffer for temporarily storing data to be written to the disk and data read from the disk.

When the disk drive receives a write command from a host (e.g., a host processor), the disk drive may temporarily store the data for the write command in the buffer and subsequently write the data from the buffer to the disk. Some disk drives do not post a write complete to the host until the disk drive has verified that the data was properly written to the disk. This may result in a delay in the completion of the write command as seen by the host.

BRIEF DESCRIPTION OF THE DRAWINGS

The accompanying drawings, which are included to provide further understanding of the invention and are incorporated in and constitute a part of this specification, illustrate embodiments of the invention and together with the description serve to explain the principles of the invention. In the drawings.

DETAILED DESCRIPTION

In the following detailed description, numerous specific details are set forth to provide a full understanding of the present invention. It will be apparent, however, to one ordinarily skilled in the art that the present invention may be practiced without some of these specific details. In other instances, well-known structures and techniques have not been shown in detail to avoid unnecessarily obscuring the present invention.

Figure 1:
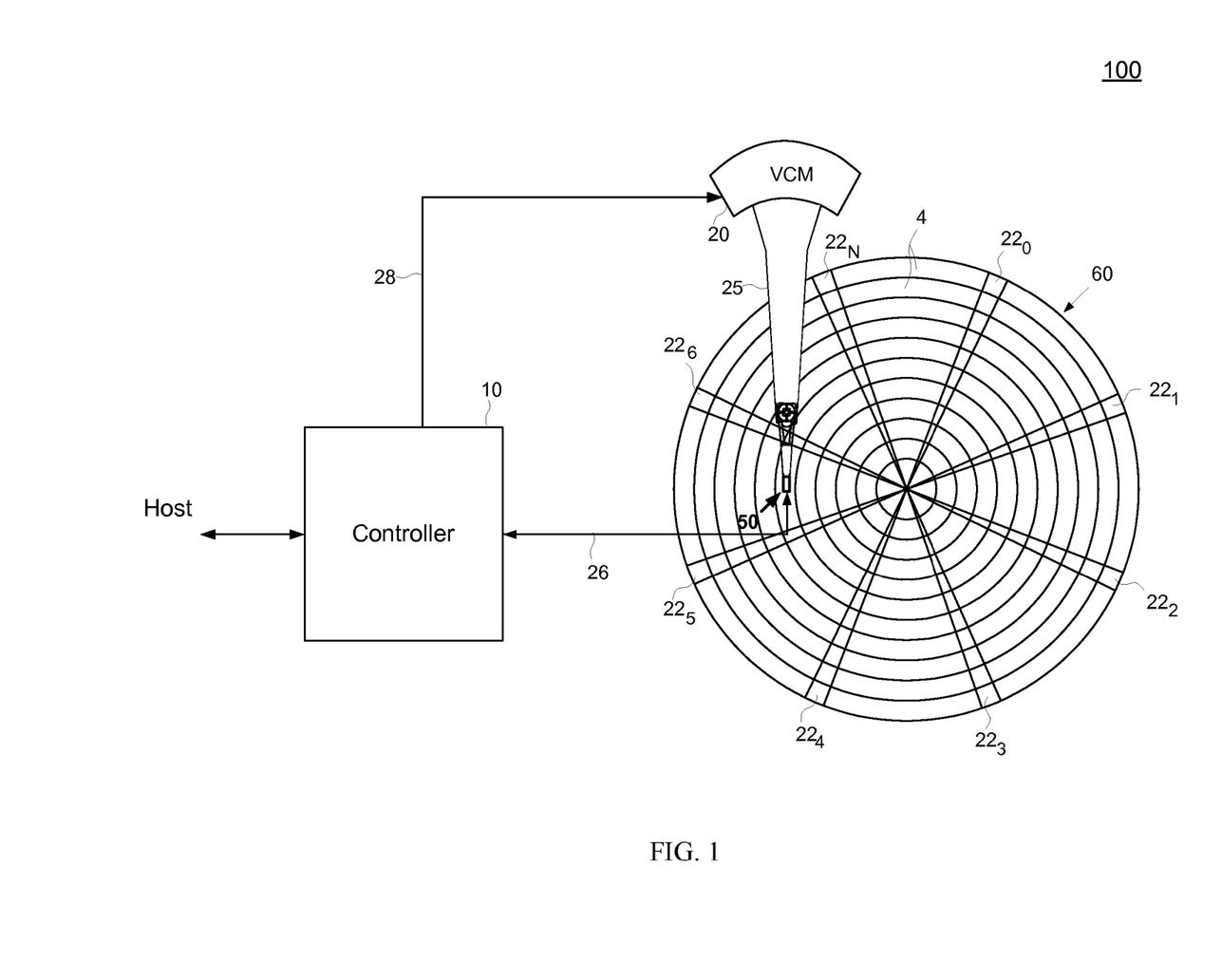
FIG. 1 is a block diagram of a disk drive according to an embodiment of the present invention.

FIG. 1 shows a disk drive 100 according to an embodiment of the present invention. The disk drive 100 comprises a rotating magnetic disk 60 and a head 50 connected to the distal end of an actuator arm 25. The actuator arm 25 is rotated about a pivot by a voice coil motor (VCM) 20 to position the head 50 radially over the disk 60. The disk 60 comprises a number of radially spaced, concentric tracks 4. Each track 4 may be divided into a number of data sectors (not shown) that are spaced circumferentially along the track 4. The disk 60 may also comprise a plurality of angularly spaced servo wedges $22_0$-$22_N$, each of which may include embedded servo information that can be read from the disk 60 by the head 50 to determine the position of the head 50 over the disk 60, as discussed further below. User data may be stored between the servo wedges $22_0$-$22_N$ in the data sectors.

The disk drive 100 also comprises a controller 10 that performs various operations of the disk drive 100 described herein. The controller 10 may be implemented using one or more processors for executing instructions and may further include memory, such as a volatile or non-volatile memory, for storing data (e.g., data being processed) and/or instructions. The instructions may be executed by the one or more processors to perform the various functions of the controller 10 described herein. The one or more processors may include a microcontroller, a Digital Signal Processor (DSP), an Application Specific Integrated Circuit (ASIC), a Field Programmable Gate Array (FPGA), hard-wired logic, analog circuitry and/or a combination thereof.

To write data to the disk 60, the controller 10 may first position the head 50 at a desired track 4 on the disk 60 by sending a control signal input 28 (e.g., control current) to the VCM 20. The controller 10 may include a servo control system that positions the head 50 using the VCM 20 based on position information read from one or more servo wedges $22_0$-$22_N$. When the head 50 is properly positioned, the controller 10 may write the data to the disk 60 using the head 50. To read data from the disk 60, the controller 10 may first position the head 50 at a desired track 4 on the disk 60 using the VCM 20, and then read the data from the disk 60 using the head 50.

The controller 10 may write data to and read data from the disk 60 in response to write/read commands from a host (e.g., host processor). When the controller 10 receives a host write command including data to be written to the disk 60, the controller 10 may temporarily hold the data from the host in a buffer (e.g., DRAM) and write the data from the buffer to the disk 60 using the head 50. In one example, the controller 10 may notify the host that the write command has been completed after the controller 10 has written the data to the disk 60 and verified that the head 50 was on track during the write operation. In another example, the controller 10 may notify the host that the write command has been completed once the data has been received in the buffer. When the controller 10 receives a host read command requesting data stored on the disk 60, the controller 10 may read the requested data from the disk 60, temporarily store the read data in the buffer and send the read data from the buffer to the host.

The host may address data in write/read commands using logical block addresses (LBAs). The controller 10 may maintain an address table mapping the LBAs from the host to physical addresses (e.g., physical block addresses) of the corresponding data on the disk 60, and use the address table to locate data on the disk 60 requested by a host read command. The use of LBAs allows the host to address data stored in the disk drive 100 without having to know the physical locations of the data on the disk 60.

Figure 2:
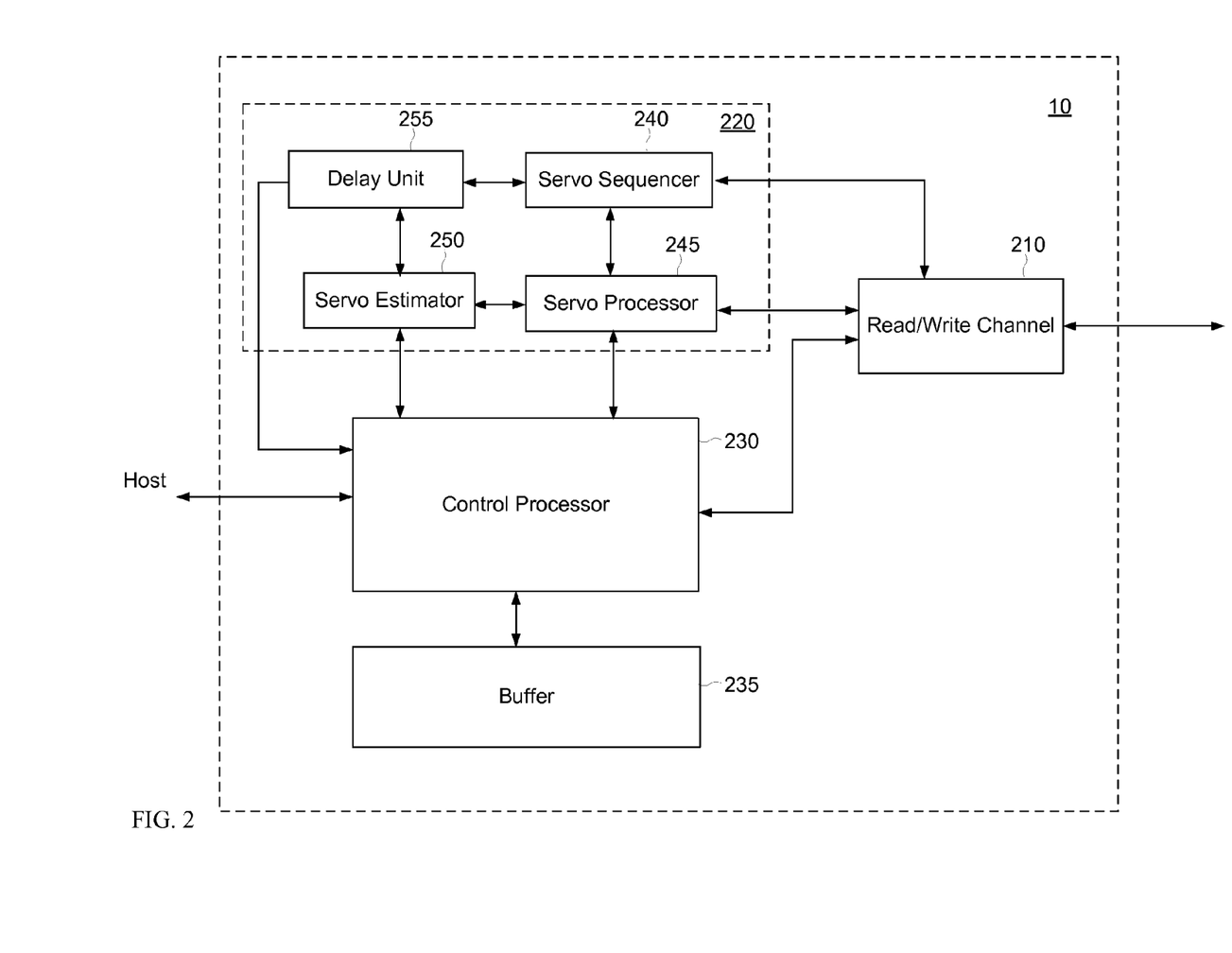
FIG. 2 is a block diagram of a controller according to an embodiment of the present invention.

FIG. 2 shows the controller 10 according to an embodiment of the present invention. The controller 10 comprises a read/write channel 210, a servo system 220, a control processor 230 and a buffer 235. The control processor 230 executes write/read operations to and from the disk 60 and performs other operations, as discussed in more detail below.

The read/write channel 210 is configured to process data to be written to the disk 60 into a write signal 26 and to output the write signal 26 to the head 50. The head 50 converts the write signal 26 into a magnetic field that magnetizes the surface of the disk 60 based on the write signal, thereby magnetically writing the data to the disk 60. The read/write channel 210 is also configured to receive a read signal 26 from the head 50 based on the magnetization of the disk surface under the head 50. The read/write channel 210 processes the read signal 26 into data, thereby retrieving the data from the disk 60. The read signal 26 may be amplified by a pre-amplifier (not shown) prior to the read/write channel 210.

The buffer 235 is used to temporarily hold data to be written to the disk 60 and/or data read from the disk 60. The buffer 235 may comprise dynamic random access memory (DRAM) or other type of memory.

The servo system 220 is configured to process servo information read from the servo wedges $22_0$-$22_N$ of the disk 60 and estimate the position of the head 50 relative to the disk 60 based on the read servo information. Other functions performed by the servo system 220 are discussed further below.

In one embodiment, the angular spacing between the servo wedges $22_0$-$22_N$ may be uniform. For each track, a servo wedge may include a track ID identifying the corresponding track, a wedge ID identifying the servo wedge, a group of servo bursts and a servo synch mark. The group of servo bursts may include a pattern of alternating magnetic transitions, which may be read from the servo wedge by the head 50 and processed by the servo system 220 to determine the position of the head 50 relative to the center of the current track 4.

In this embodiment, the disk 60 may rotate at a relatively constant angularly speed during write and/or read operations, in which the servo wedges $22_0$-$22_N$ are read from the disk 60 at regular intervals as the disk 60 rotates. The time interval between consecutive servo wedges may be referred to as the wedge-to-wedge time.

The servo system 220 comprises a servo sequencer 240, a servo processor 245, a servo estimator 250 and a delay unit 255. The servo sequencer 240 is configured to estimate when the head 50 will be over one of the servo wedge $22_0$-$22_N$. In one embodiment, the servo sequencer 220 may instruct the read/write channel 210 to start reading servo information when the servo sequencer 220 estimates that the head 50 will be over a servo wedge and trigger the servo processor 245 to start processing the read servo information, as discussed further below.

In one embodiment, the servo processor 245 may generate a position error signal (PES) based on the read servo information indicating an offset between the head position and the center of the current track 4. The PES may be feed into a servo control loop (not shown) that adjusts the control signal 28 to the VCM 20 to reduce the PES and keep the head 50 on track during track following.

At each servo wedge, the servo processor 245 is configured to estimate the position of the head 50 based on the read servo bursts from the servo wedge. Thus, the servo processor 245 estimates the head position at a sample rate determined by the spacing between the servo wedges and the rotational speed of the disk 60. The servo processor 245 may generate track status information at each servo wedge indicating whether the head 50 is currently on track at the servo wedge. The servo processor 245 may determine that the head 50 is off track when the estimated head position is offset from the center of the track 4 by a predetermined error threshold. In this case, the current write operation may be inhibited to prevent an off-track write to the disk 60, which can potentially overwrite data in an adjacent track resulting in data loss.

In one embodiment, the servo estimator 250 is configured to receive estimates of the head position from the servo processor 245 and estimate the head position at a future time relative to the current servo wedge. The servo estimator 250 may also estimate the head velocity, head acceleration, and/or bias forces at the future time. The servo estimator 250 may estimate the future head position using a model that models the mechanics of the disk drive and estimates the head position at a future time as a function of the current position, velocity and acceleration of the head, bias forces, and/or the control input signal 28 to the VCM 20. The bias forces may include a spring force from a flexure circuit pushing on the actuator arm 25, imbalances in the VCM 20 (e.g., caused by mounting the disk drive on its side) and/or other bias forces. The control input signal 28 accounts for movement of the head 50 by the VCM 20 in response to the control signal input 28. Previous estimates of the head velocity, head acceleration and/or bias forces made by the servo estimator 250 at the previous wedge may be inputted into the model as the current head velocity, head acceleration and/or bias forces. The servo estimator 250 may also estimate the current head velocity and head acceleration based on current and previous estimates of the head position.

At each servo wedge, the servo estimator 250 may use the estimate of the head position at the future time to generate track status information indicating whether the head 50 will be on track at the future time relative to the current servo wedge. The future time may correspond to the next servo wedge and/or any time between the current servo wedge and the next servo wedge. In this embodiment, the servo estimator 250 may predict that the head 50 will be off track when the estimated future head position is offset from the center of the track by a predetermined error threshold. When the servo estimator 250 predicts that the head 50 will be off track at the future time, the current write operation may be stopped to prevent an off-track write in the future. In another embodiment, the servo estimator 250 may compute an off track estimate based on a linear combination of the estimated head position, head velocity and/or head acceleration at the future time and predict that the head 50 will be off track when the off track estimate exceeds an error threshold. The estimated head velocity may be included in the off track estimate to take into account whether the head 50 is moving away or towards the track 4 at the future time.

In one embodiment, the control processor 230 executes host initiated write operations by receiving a host write command including data to be written to the disk 60, temporarily holding the data in the buffer 235 and writing the data from the buffer 235 to the disk 60 via the read/write channel 210. In this embodiment, the control processor 230 may include an LBA counter that keeps track of the LBAs of data in the buffer 235 that have been written to the disk 60. The control processor 230 may update the LBA counter as data in the buffer 235 is written to the disk 60.

The control processor 230 may send a write completion message to the host reporting that certain data has been successfully written to the disk 60 after the control processor 230 has verified that the data has been written to the disk 60 and the head 50 was on track during the write operation for the data. In this embodiment, the message may include the LBAs of the data that have been successfully written to the disk 60. The process of notifying the host that the data has been written to the disk may be referred to as releasing the data from the host. In addition, the control processor 230 may release the data from the buffer 235, in which case the data no longer needs to be held in the buffer 235 and can be overwritten in the buffer 235 to free up space in the buffer 235 for new data.

The control processor 230 may determine which data in the buffer 235 has been written to the disk 60 since the last write completion message to the host by examining the LBA counter. The control processor 230 may also determine whether the head 50 was on track during the write operation for the data based on track status information from the servo processor 245. For example, the controller processor 230 may determine that the head 50 was on track during the write operation when track status information prior to the write operation and the track status information after the write operation both indicate on track status.

Figure 3:
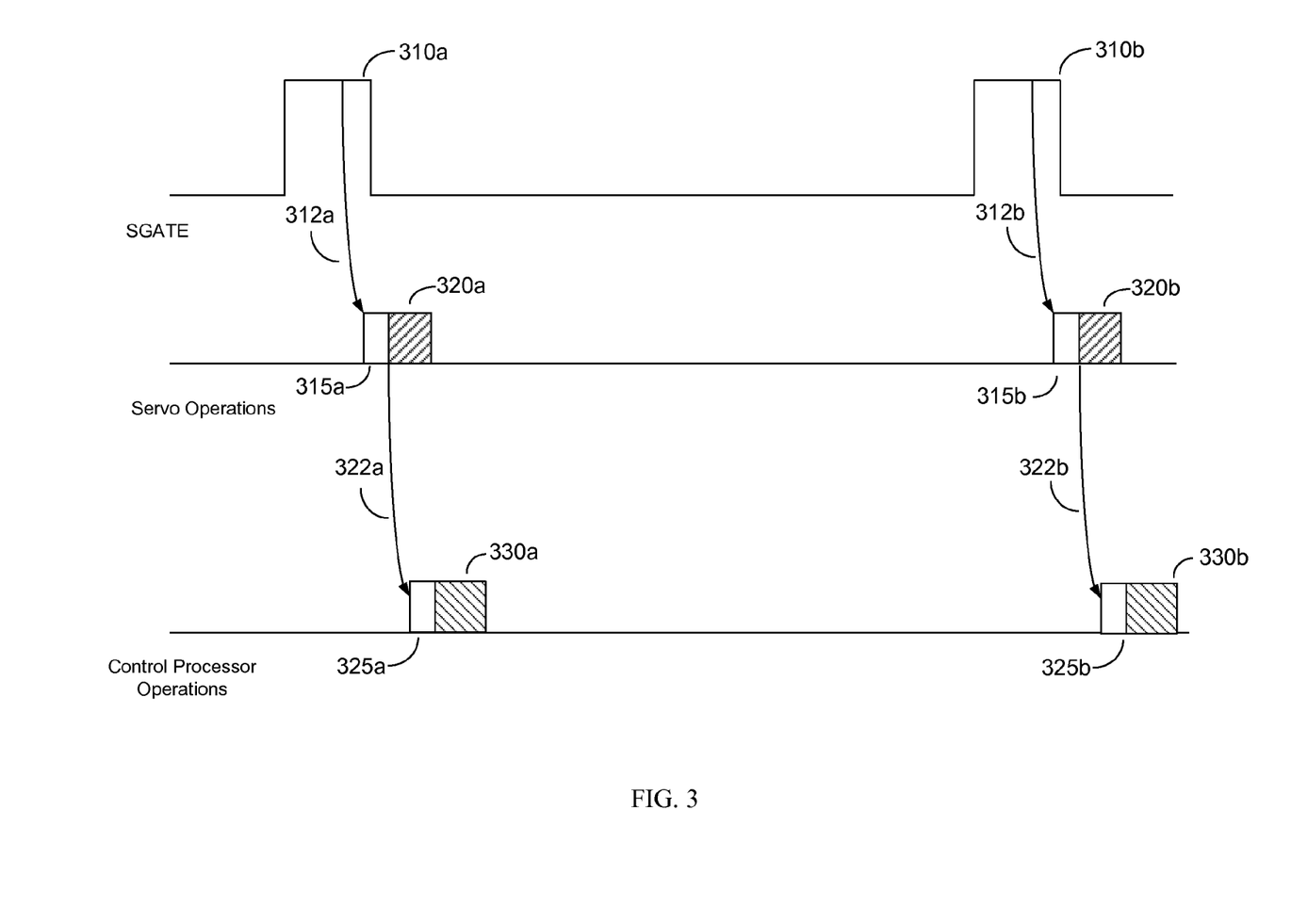
FIG. 3 is a time diagram showing an example of release operations in a disk drive.

FIG. 3 is a time diagram showing an example of the timing of operations performed in the disk drive 100.

FIG. 3 shows the timing of a servo gate (SGATE) at the servo sequencer 240. The servo gate is asserted each time the head 50 approaches one of the servo wedges $22_0$-$22_N$. FIG. 3 shows an example of the servo gate asserted 310a and 310b for two consecutive servo wedges. Each time the servo gate is asserted, the servo sequencer 240 instructs the read/write channel 210 to begin reading servo information from the corresponding servo wedge.

FIG. 3 also shows the timing of servo operations performed by the servo processor 245 and the servo estimator 250. Each time the servo gate is asserted 310a and 310b, the servo sequencer 240 issues an interrupt 312a and 312b to the servo processor 245. In response to the interrupt 312a and 312b, the servo processor 245 processes 315a and 315b the read servo information and generates track status information for the corresponding servo wedge. The servo processor 245 may store the track status information in a register in the servo system 220 and feed processed servo information to the servo estimator 250. The servo estimator 250 estimates 320a and 320 whether the head 50 will be on track at a future time (e.g., the next servo wedge) based on the processed servo information from the servo processor 245 and generates track status information indicating whether the head 50 will be on track at the future time.

After generating the track status information, the servo processor 245 issues an interrupt 322a and 322b to the control processor 230. In response to the interrupt 322a and 322b, the control processor 230 performs a task 325a and 325b that retrieves the track status information from the servo processor 245 and executes a disk task 330a and 330b that manages the release of data from the host by notifying the host that the data has been written to the disk. The disk task 330a and 330 may optionally release the data from the buffer 235. The disk task 330a and 330b may be implemented with a program routine that is executed by the control processor 230 when the control processor 230 receives the interrupt 322a and 322b.

In one embodiment, the control processor 230 performs the disk task 330a and 330b by determining which data in the buffer 235 has been written to the disk 60 since the last data release and verifying whether the head 50 was on track during the write operation for the data. As discussed above, the control processor 230 may determine which data in the buffer 235 has been written to the disk 60 by examining the LBA counter, which keeps track of the LBAs of data that has been written to the disk 60. The control processor 230 may verify that the head 50 was on track during the write operation based on the track status information for the current servo wedge and one or more previous servo wedges. For example, if the data was written to the disk between the current servo wedge and a previous servo wedge and the status information for both indicate on track status, then the control processor 230 may determine that the head 50 was on track during the write operation for the data. If the control processor 230 determines that the head 50 was on track during the write operation, then the control processor 230 may release the data from the host, e.g., by posting a write complete to the host for the data. The control processor 230 may also release the data from the buffer 235.

Thus, the control processor 230 makes a decision at each servo wedge whether to release data from the host and/or buffer 235. A write command from the host may not be considered completed by the disk drive until the control processor 230 posts a write complete to the host notifying the host that data has been written, which occurs at one of the servo wedges. This results in a latency in the completion of write commands from the host that is fixed by the sample rate of the servo wedges. The latency is seen at the host interface as a delay in the completion of a write command.

One way to reduce the latency is to increase the sample rate of the servo wedges so that the control processor 230 releases data from the host and/or buffer 235 at a faster rate. The sample rate of the servo wedges may be increased by increasing the rotational speed of the disk 60. However, increasing the rotational speed of the disk 60 may require increasing clock speeds in the controller 10 to handle faster data rates to and from the disk 60 and lead to increased power consumption. The sample rate of the servo wedges may also be increased by increasing the number of servo wedges on the disk 60. However, increasing the number of servo wedges may reduce format efficiency of the disk 60.

A method according an embodiment of the present invention reduces the latency by taking advantage of the track status information from the servo estimator 250. As discussed above, the track status information from the servo estimator 250 indicates whether the head 50 will be on track at a future time relative to the current servo wedge. In this embodiment, the track status information from the servo estimator 250 is used to create an additional release point between the current servo wedge and the next servo wedge, cutting down on the latency. Thus, the method according to this embodiment reduces the latency of data releases without suffering from the increased format or servo overheads of the previous method.

Figure 4:
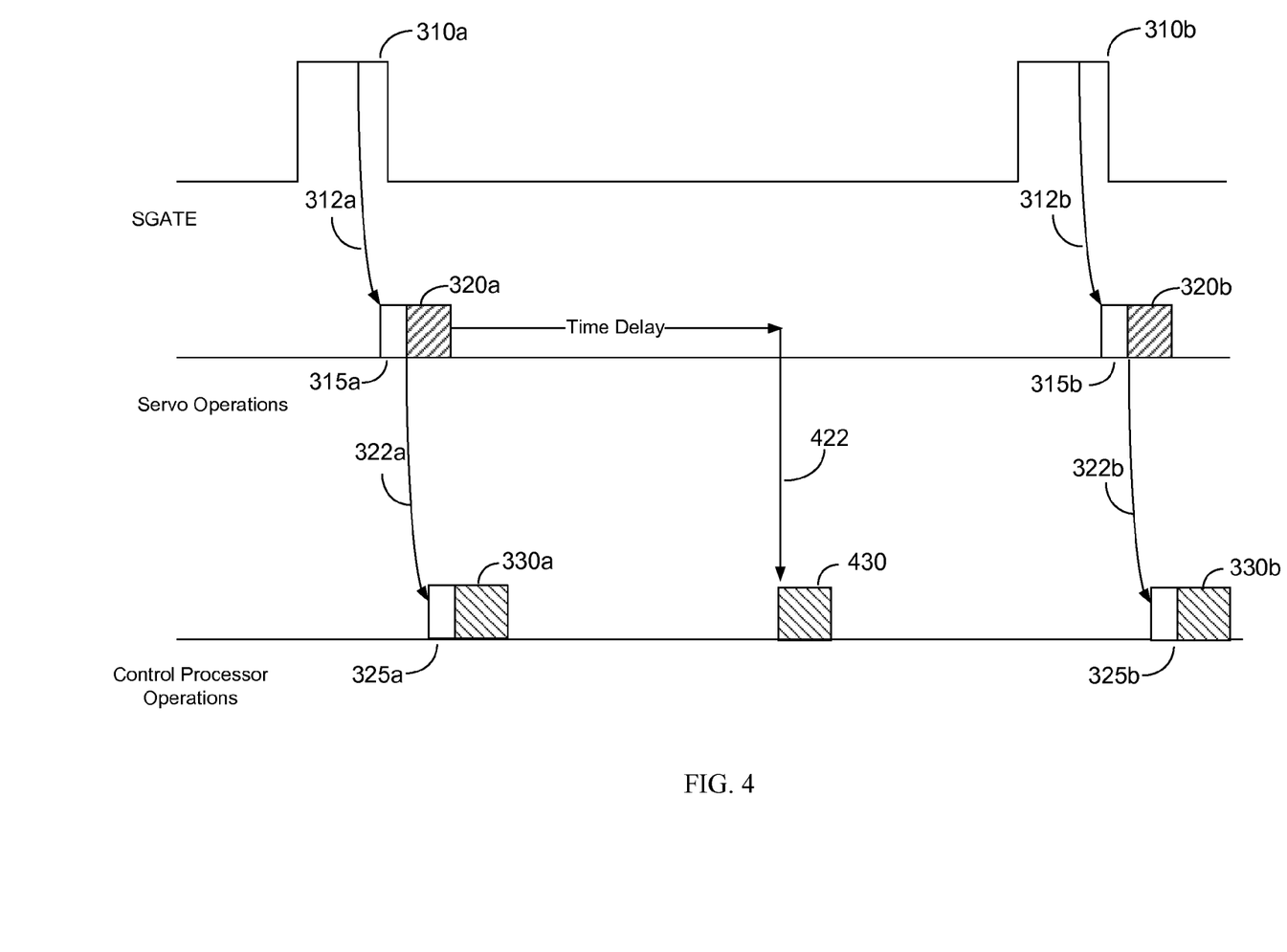
FIG. 4 is a time diagram showing an example of release operations including a release operation between servo wedges according to an embodiment of the present invention.

FIG. 4 is a time diagram showing an example of a release operation between servo wedges according to an embodiment of the present invention.

In this embodiment, the control processor 230 makes a decision whether to release data from the host and/or buffer 235, which is the same as before in FIG. 3. In addition, the control processor 230 is interrupted 422 between servo wedges. In the example in FIG. 4, the control processor 230 is interrupted 422 after a time delay from the servo wedge corresponding to servo gate 310a. In this example, the time delay causes the interrupt 422 to occur at approximately the midpoint between servo wedges.

In response to the interrupt 422, the control processor 230 performs a disk task 430 to determine whether to release data from the host, e.g., by posting a write complete to the host for the data. The control processor 230 may also release the data from the buffer 235. In one embodiment, the control processor 230 verifies that the track was on track during the write operation for the data based on the track status information from the servo estimator 250. As discussed above, the track status information from the servo estimator 250 estimates whether the head 50 will be on track at a future time. In this embodiment, the control processor 230 uses the track status information from the servo estimator 250 computed at the servo wedge corresponding to servo gate 310a to determine whether the head 50 is on track at the midpoint between the servo wedge corresponding to servo gate 310a and the next servo wedge corresponding to servo gate 310b. Since this track status information from the servo estimator 250 estimates whether the head 50 will be on track at a future time with respect to the servo wedge corresponding to servo gate 310a, the control processor 230 can use this track status information to estimate whether the head 50 is on track at a time (e.g., midpoint) between the servo wedge corresponding to servo gate 310a and the next servo wedge corresponding to servo gate 310b.

If the control processor 230 determines that the head 50 is on track between the servo wedges based on the track status information from the servo estimator 250, then the control processor 230 may release data from the host and/or buffer 235. The task 325a and 325b for retrieving the track status information from the servo processor 245 may be skipped as shown in FIG. 4 to save execution time. The track status information from the servo estimator 250 may be stored in a register and read by the control processor 230 from the register. The track status information may be in the form of a bit, in which the bit value indicates an on track or an off track status.

Thus, the control processor 230 uses the track status information from the servo estimator 250 computed at the servo wedge corresponding to servo gate 310a to create an additional release point between the servo wedge corresponding to servo gate 310a and the servo wedge corresponding to servo gate 310b (e.g., midpoint between the servo wedges). This effectively doubles the rate at which the control processor 230 releases data from the host and/or buffer 235 without having to increase the sample rate of the servo wedges, thereby doubling the release performance. As a result, the latency for data releases and write completion messages to the host is reduced. In the example in FIG. 4, if data is written to the disk 60 between the servo wedge corresponding to servo gate 310a and the interrupt 422, then the control processor 230 may release the data from the host and/or buffer 235 without having to wait until the next servo wedge corresponding to servo gate 310b. For the example in which the interrupt 422 occurs at the midpoint between servo wedges, the latency is reduced by half the wedge-to-wedge time To implement the method illustrated in FIG. 4, the delay unit 255 may be configured to issue the interrupt 422 to the control processor 230 between servo wedges. In one embodiment, the delay unit 255 may issue the interrupt after a time delay from the completion of track status information by the servo estimator 250. For the example in which the interrupt 422 occurs at the midpoint between servo wedges, the time delay may approximate the time duration for the disk 60 to rotate half the distance between consecutive servo wedges (i.e., half the wedge-to-wedge time). In this embodiment, the servo estimator 250 may post a completion flag in a register when it has completed the track status information and the delay unit 255 may start the time delay when the completion flag is asserted. The delay unit 255 may also start the time delay at other times. For example, the time delay unit 255 may start the time delay when the servo gate is asserted, when a synch mark is read from a servo wedge, when the servo processor 245 feeds processed servo information to the servo estimator 250, or other time.

The delay unit 255 may be programmable to adjust the time delay depending on a desired position for the release operation between consecutive servo wedges. For example, the time delay may be adjusted between the time for the disk 60 to rotate ⅓ the distance between consecutive servo wedges and the time for the disk 60 to rotate ⅔ of the distance between consecutive servo wedges.

In one embodiment, the delay unit 255 may issue two interrupts to the control processor 230 after two different time delays to create two release points between consecutive servo wedges instead of one release point. For example, the delay unit 255 may issue one interrupt after a time delay approximately equal to the time for the disk 60 to rotate ⅓ the distance between consecutive servo wedges and issue another interrupt after a time delay approximately equal to the time for the disk 60 to rotate ⅔ of the distance between consecutive servo wedges. In response to each interrupt, the control processor 230 makes a decision whether to release data from the host and/or buffer 235.

In one embodiment, the servo estimator 250 may estimate whether the head 50 will be on track at two or more different future times with respect to the current servo wedge. For example, the servo estimator 250 may estimate whether the head 50 will be on track at a next servo wedge based on the processed servo information for the current servo wedge. The servo estimator 250 may also estimate whether the head 50 will be on track at the midpoint between the current servo wedge and the next servo wedge based on the processed servo information. The control processor 230 may use the estimation for the midpoint to determine whether the head 50 is on track for a release point at the midpoint between the current and next servo wedges.

In one embodiment, the control processor 230 may release data from the host at a release point between servo wedges without releasing the data from the buffer 235. In this embodiment, the data may be held in the buffer 235 until the next servo wedge so that the control processor 230 can reconfirm that the data was written on track using track status information based on the next servo wedge before releasing the data from the buffer 235. Thus, the control processor 230 releases data from the host at the release point, thereby reducing the latency of write completion as seen by the host, while holding the data in the buffer 235. If the control processor 230 determines that the data was written on track at the next servo wedge, then the control processor 230 may release the data from the buffer 235 at that time. If the control processor 230 determines that the data was not written on track at the next servo wedge, then the control processor 230 may retry writing the data to the disk 60. Thus, the release operation between servo wedges may only release data from the host by notifying the host that the data was written to the disk, while holding the data in the buffer 235 to later reconfirm that the data was properly written to the disk. This embodiment mitigates risk of losing data in the disk drive in case the status information from the servo estimator 250 is incorrect.

Figure 5:
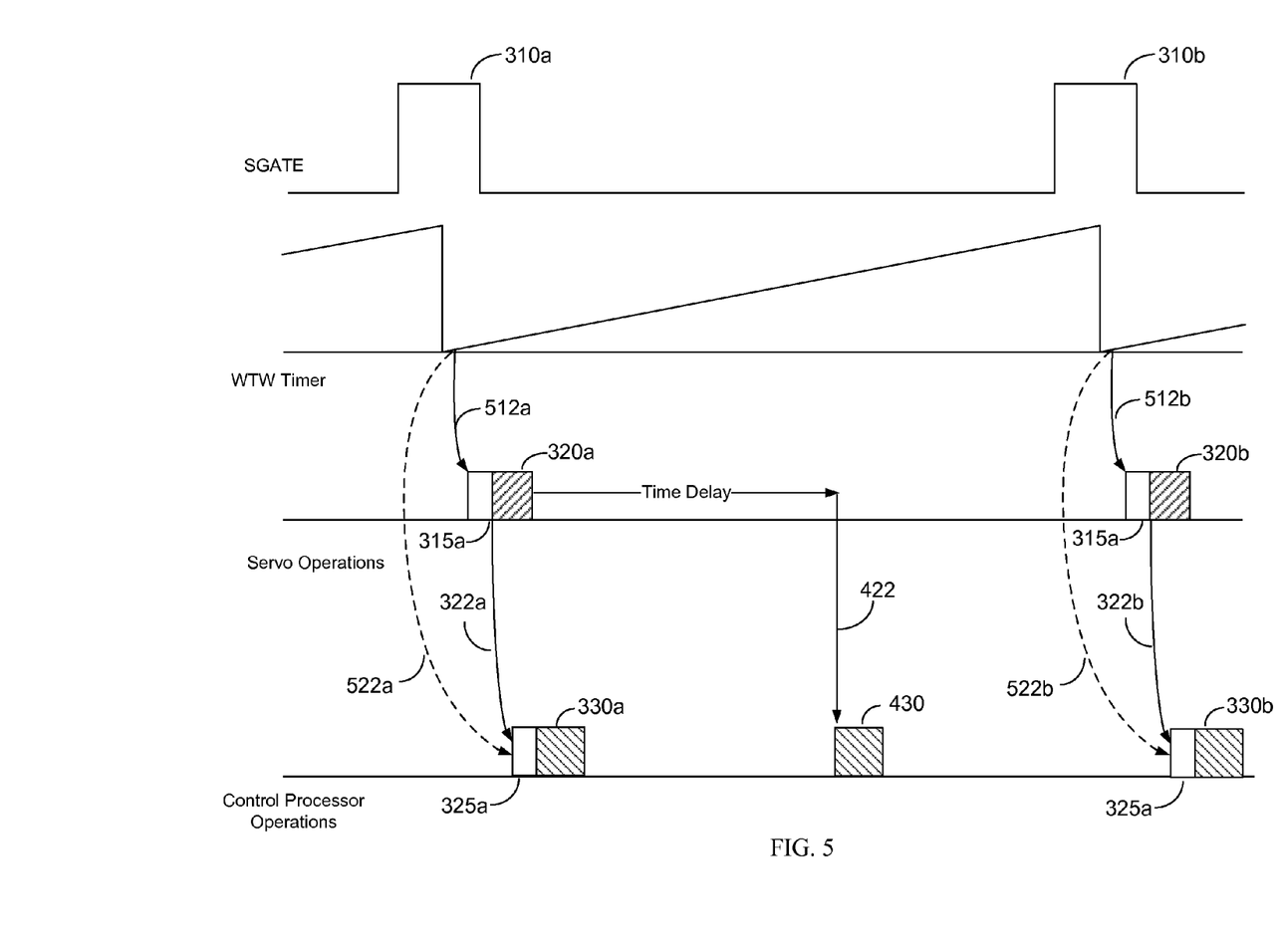
FIG. 5 is a time diagram showing an example of release operations including a release operation between servo wedges according to another embodiment of the present invention.

FIG. 5 is a time diagram showing an example of a wedge-to-wedge (WTW) timer in the servo sequencer 240 according to one embodiment. The WTW timer may include a WTW counter that increments a count value between servo wedges and resets the count value to zero at each servo wedge, as shown in FIG. 5. In this embodiment, the count value of the WTW counter may be used to measure a time duration between servo wedges. For example, the servo sequencer 240 may determine that the head 50 is approaching the next servo wedge when the count value reaches a count threshold corresponding to the wedge-to-wedge time. In this example, the servo sequencer 240 may assert the servo gate for the next servo wedge when the count value reaches the count threshold. The servo sequencer 240 may synchronize resets of the WTW counter with the servo synch marks read from the servo wedges or other time reference.

In one embodiment, the interrupt 512a and 512b to the servo processor 245 to process read servo information is timed off of the count value of the WTW counter. In this embodiment, the servo sequencer 240 issues the interrupt 512a and 512b when the count value reaches a certain count threshold. The count threshold may correspond to a short time duration after the write/read channel 210 starts reading servo information. The short time duration may be chosen so that a certain amount of servo information is read from the current servo wedge by the write/read channel 210 before the servo processor 245 starts processing the read servo information. The read servo information may be temporarily stored in memory before being processed by the servo processor 245.

In one embodiment, the interrupt 522a and 522b to the control processor 230 to perform the task 325a and 325b of retrieving the status information from the servo processor 245 may also be timed off of the count value of the WTW counter. In this embodiment, the servo sequencer 240 issues the interrupt 522a and 522b to the control processor 230 when the count value reaches a certain count threshold. The count threshold may be chosen to provide sufficient time for the servo processor 245 to process the servo information from the current servo wedge. Although the example in FIG. 5 shows the interrupt 512a and 512b for the servo processor 245 and the interrupt 522a and 522b issued at the same count value of the WTW counter, those skilled in the art will appreciate that the interrupts may be issued at different count values. Further, the interrupt 522a and 522b to the control processor 230 is represented by a dashed arrow in FIG. 5 to indicate that the interrupt 522a and 522b can be used as an alternative to the interrupt 322a and 322b issued from the servo processor 245 to the control processor 230.

Figure 6:
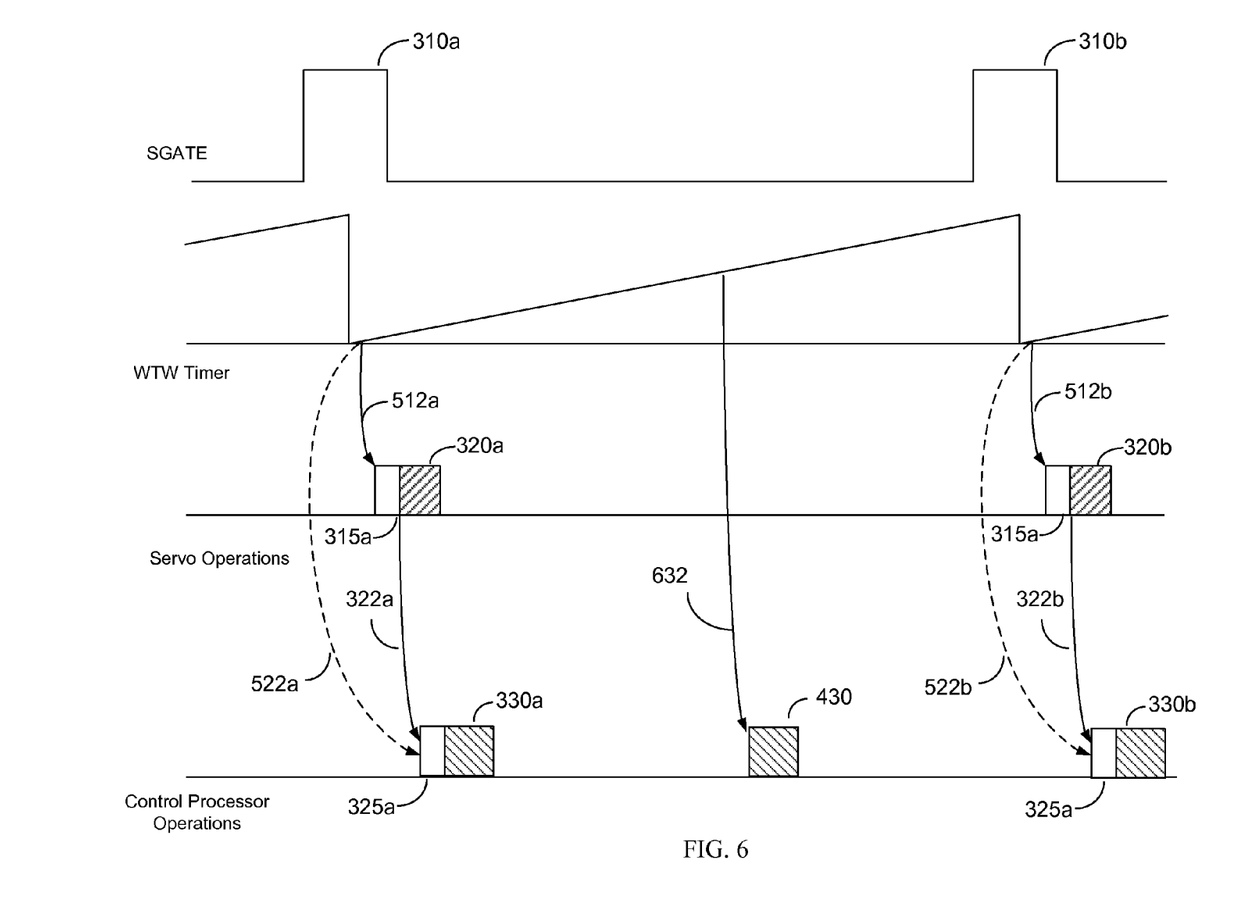
FIG. 6 is a time diagram showing an example of release operations including a release operation between servo wedges according to still another embodiment of the present invention.

FIG. 6 is a time diagram showing an example of a release operation between servo wedges that is timed off of the WTW counter according to an embodiment of the present invention. In this embodiment, the delay unit 255 may issue the interrupt 632 to the control processor 230 to perform the disk task 430 when the count value of the WTW counter reaches a certain count threshold. For the example where the release operation is performed at the midpoint between servo wedges, the count threshold may correspond to a time duration equal to half the wedge-to-wedge time. The count threshold may be adjusted depending on a desired position for the release operation between consecutive servo wedges.

Figure 7:
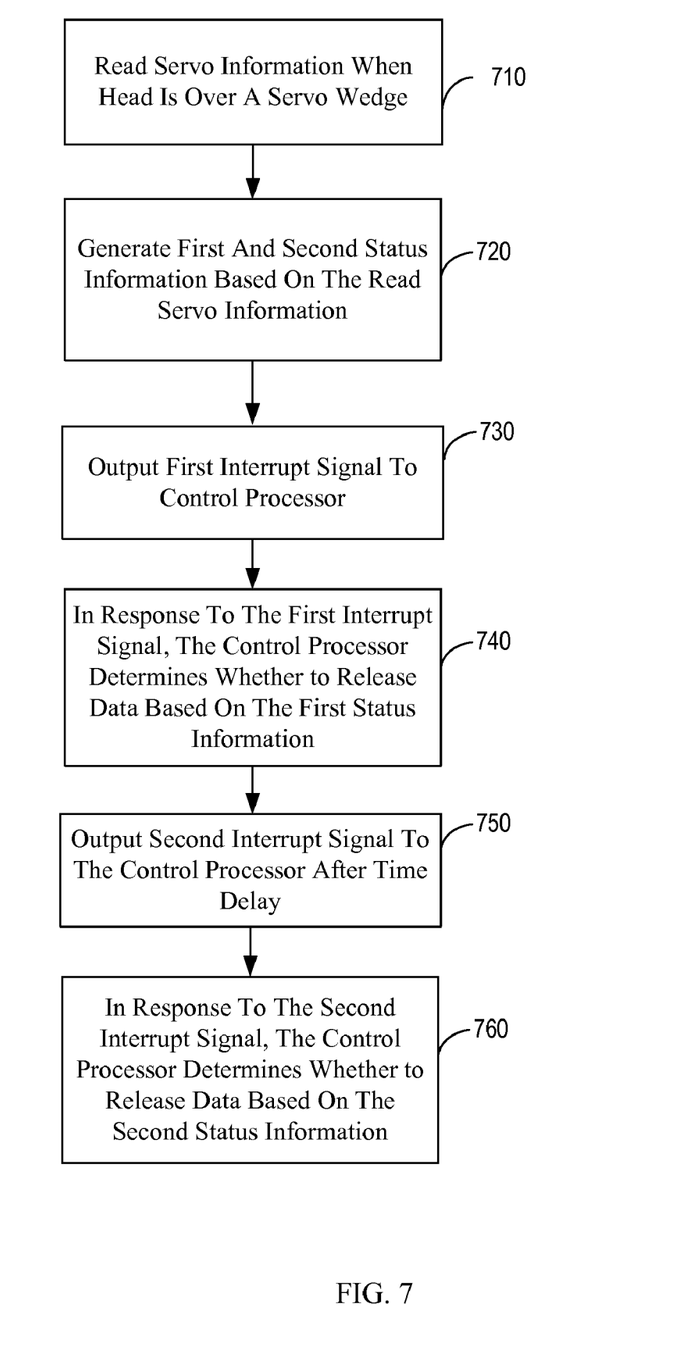
FIG. 7 is a flow diagram of a method of releasing data according to an embodiment of the present invention.

FIG. 7 shows a method of releasing data in a disk drive according to an embodiment of the present invention. The method may be performed by the write/read channel 210, the servo system 220 and the control processor 230.

In step 710, servo information is read from a servo wedge when the head 50 is over the servo wedge. In step 720, first and second status information is generated based on the read servo information. The first status information may indicate whether the head 50 is currently on track. The second status information may indicate whether the head 50 will be on track at a future time with respect to the current servo wedge. The first and second status information may be generated by the servo processor 245 and the servo estimator 250, respectively.

In step 730, a first interrupt signal is outputted to the control processor 230. In step 740, in response to the first interrupt signal, the control processor 230 determines whether to release data based on the first status information. For example, if the first status information indicates on track status, then the control processor 230 may release the data from the host by notifying the host that the write operation for the released data is completed. The control processor 230 may also release the data from the buffer 235.

In step 750, a second interrupt signal is outputted to the control processor 230 after a time delay. The time delay may correspond to half the wedge-to-wedge time or other time duration. In step 760, in response to the second interrupt signal, the control processor 230 determines whether to release data based on the second status information. For example, if the second status information indicates on track status, then the control processor 230 may release the data from the host by notifying the host that the write operation for the released data is completed. The control processor 235 may also release the data from the buffer 235. The released data may include data that was written to the disk during the time delay.

For the purposes of the present specification, it should be appreciated that the terms "processor", "microprocessor", and "controller", etc., refer to any machine or collection of logic that is capable of executing a sequence of instructions and shall be taken to include, but not be limited to, general purpose microprocessors, special purpose microprocessors, central processing units (CPUs), digital signal processors (DSPs), application specific integrated circuits (ASICs), multi-media controllers, signal processors and microcontrollers, etc.

The description of the invention is provided to enable any person skilled in the art to practice the various embodiments described herein. While the present invention has been particularly described with reference to the various figures and embodiments, it should be understood that these are for illustration purposes only and should not be taken as limiting the scope of the invention.

There may be many other ways to implement the invention. Various functions and elements described herein may be partitioned differently from those shown without departing from the spirit and scope of the invention. Various modifications to these embodiments will be readily apparent to those skilled in the art, and generic principles defined herein may be applied to other embodiments. Thus, many changes and modifications may be made to the invention, by one having ordinary skill in the art, without departing from the spirit and scope of the invention.

A reference to an element in the singular is not intended to mean "one and only one" unless specifically stated, but rather "one or more." The term "some" refers to one or more. Underlined and/or italicized headings and subheadings are used for convenience only, do not limit the invention, and are not referred to in connection with the interpretation of the description of the invention. All structural and functional equivalents to the elements of the various embodiments of the invention described throughout this disclosure that are known or later come to be known to those of ordinary skill in the art are expressly incorporated herein by reference and intended to be encompassed by the invention. Moreover, nothing disclosed herein is intended to be dedicated to the public regardless of whether such disclosure is explicitly recited in the above description.

What is claimed is:

1. A disk drive, comprising:
a disk comprising a plurality of servo wedges;
a head actuated over the disk;
a read/write channel configured to read data from and write data to the disk using the head;
a control processor configured to write data from a buffer to the disk via the read/write channel; and
a servo system configured to read servo information from one of the servo wedges via the read/write channel when the head is positioned over the servo wedge, to generate first and second status information based on the read servo information, to output the first and second status information to the control processor, and to output first and second interrupt signals to the control processor, the first and second interrupt signals being spaced apart by a time delay;
wherein, in response to the first interrupt signal, the control processor is configured to determine whether to release data from a host based on the first status information, and in response to the second interrupt signal, the control processor is configured to determine whether to release data from the host based on the second status information.

2. The disk drive of claim 1, wherein the time delay is approximately equal to a time for the disk to rotate ⅓ to ⅔ a distance between two consecutive servo wedges during a write operation.

3. The disk drive of claim 2, wherein the time delay is approximately equal to the time for the disk to rotate ½ the distance between the two consecutive servo wedges.

4. The disk drive of claim 1, wherein the first status information indicates whether the head is currently on track and the second status information indicates whether the head will be on track at a future time.

5. The disk drive of claim 4, wherein the future time corresponds to the time delay.

6. The disk drive of claim 1, wherein the control processor is configured to release data from the host by sending a message to the host indicating that the data has been written to the disk.

7. The disk drive of claim 1, wherein the control processor is configured to also release data from the buffer when releasing the data from the host.

8. A disk drive, comprising:
a disk comprising a plurality of servo wedges;
a head actuated over the disk;
a read/write channel configured to read data from and write data to the disk using the head;
a control processor configured to write data from a buffer to the disk via the read/write channel; and
a servo system comprising,
a servo sequencer configured to track when the head is positioned over one of the servo wedges, and to output a trigger each time the head is positioned over one of the servo wedges;
a servo processor configured to receive the trigger from the servo sequencer, and, in response to the trigger, to read servo information from the corresponding servo wedge via the read/write channel, to process the read servo information into first status information, and to output a first interrupt signal and the first status information to the control processor;
a servo estimator configured to receive processed servo information from the servo processor, to estimate whether the head will be on track at a future time based on the processed servo information, and to output second status information to the control processor based on the estimate; and
a delay unit configured to output a second interrupt signal to the control processor, wherein the second interrupt signal is spaced apart from the first interrupt by a time delay;
wherein in response to the first interrupt signal, the control processor is configured to determine whether to release data from a host based on the first status information, and in response to the second interrupt signal, the control processor is configured to determine whether to release data from the host based on the second status information.

9. The disk drive of claim 8, wherein the time delay is approximately equal to a time for the disk to rotate ⅓ to ⅔ a distance between two consecutive servo wedges during a write operation.

10. The disk drive of claim 9, wherein the time delay is approximately equal to the time for the disk to rotate ½ the distance between the two consecutive servo wedges.

11. The disk drive of claim 8, wherein the first status information indicates whether the head is currently on track and the second status information indicates whether the head will be on track at a future time.

12. The disk drive of claim 11, wherein the future time corresponds to the time delay.

13. The disk drive of claim 8, wherein the time delay is programmable.

14. The disk drive of claim 8, wherein the servo sequencer comprises a wedge-to-wedge (WTW) counter configured to run a count value between consecutive servo wedges, and the delay unit is configured to output the second interrupt signal when the count value is equal to or exceeds a count threshold.

15. The disk drive of claim 14, wherein the count threshold corresponds to a midpoint between the consecutive servo wedges.

16. The disk drive of claim 8, wherein the control processor is configured to release data from the host by sending a message to the host indicating that the data has been written to the disk.

17. The disk drive of claim 8, wherein the control processor is configured to also release data from the buffer when releasing data from the host.

18. A method of releasing data in a buffer in a disk drive, the disk drive including a disk comprising a plurality of servo wedges, a head actuated over the disk, and a control processor, the method comprising:
reading servo information from one of the servo wedges when the head is positioned over the servo wedge;
generating first and second status information based on the read servo information;
outputting a first interrupt signal to the control processor;
in response to the first interrupt signal, determining, at the control processor, whether to release data from a host based on the first status information;
outputting a second interrupt signal to the control processor, wherein the second interrupt signal is spaced apart from the first interrupt signal by a time delay; and
in response to the first interrupt signal, determining, at the control processor, whether to release data from the host based on the second status information.

19. The method of claim 18, wherein the time delay is approximately equal to a time for the disk to rotate ⅓ to ⅔ a distance between two consecutive servo wedges during a write operation.

20. The method of claim 19, wherein the time delay is approximately equal to the time for the disk to rotate ½ the distance between the two consecutive servo wedges.

21. The method of claim 18, wherein the first status information indicates whether the head is currently on track and the second status information indicates whether the head will be on track at a future time.

22. The method of claim 21, wherein the future time corresponds to the time delay.

23. The method of claim 18, further comprising, when the control processor determines to release data from the host, sending a message to the host indicating that the data has been written to the disk.

* * * * *